United States Patent [19]

Wakabayashi et al.

[11] 4,248,852
[45] Feb. 3, 1981

[54] PROCESS FOR THE PRODUCTION OF ALUMINA SUITABLE FOR USE AS A CATALYST CARRIER

[75] Inventors: Motoyoshi Wakabayashi, Omi; Takeo Ono, Kawasaki; Osamu Togari, Sagamihara; Munekazu Nakamura, Kamakura, all of Japan

[73] Assignee: Chiyoda Chemical Engineering & Construction Co., Ltd., Tokyo, Japan

[21] Appl. No.: 66,869

[22] Filed: Aug. 15, 1979

[30] Foreign Application Priority Data

Aug. 15, 1978 [JP] Japan .................................. 53-98725

[51] Int. Cl.³ ............................. C01F 7/02; C01F 7/34
[52] U.S. Cl. .................................. 423/626; 252/463; 423/625; 423/628; 423/630; 423/631
[58] Field of Search ............... 423/625, 628, 626, 630, 423/631; 252/463

[56] References Cited

U.S. PATENT DOCUMENTS

| | | | |
|---|---|---|---|
| 3,468,625 | 9/1969 | Nightingale | 423/628 |
| 3,898,322 | 8/1975 | Leach | 423/628 |
| 4,098,874 | 7/1978 | Mitachi et al. | 423/628 |
| 4,172,809 | 10/1979 | Triki | 423/628 |
| 4,175,118 | 11/1979 | Wasserman et al. | 423/628 |

*Primary Examiner*—Herbert T. Carter
*Attorney, Agent, or Firm*—Frishauf, Holtz, Goodman & Woodward

[57] ABSTRACT

Improved γ-alumina suitable for use as a catalyst carrier having high mechanical strength, a large specific surface area, and a substantially uniform pore size distribution in a relatively small portion of the pore size range below 500 Å. Said alumina is produced by first establishing a seed aluminum hydroxide hydrogel having a pH of between 6 and 10 and then repetitively and sequentially adding an aluminum compound to adjust the pH to less than 5 or more than 11 to dissolve crystallites of aluminum hydroxide followed by addition of a neutralizing agent to return the hydrogel to the pH range from about 6 to 10 to cause pseudo-boehmite crystallites to grow. After a sufficient number of repetitions of said sequential addition, sparse aggregates of crystallites of the desired structure are formed. These are dried and calcined to produce the said alumina.

15 Claims, 4 Drawing Figures

PROCESS FOR THE PRODUCTION OF ALUMINA SUITABLE FOR USE AS A CATALYST CARRIER

BACKGROUND OF THE INVENTION

1. Field of the Invention

This invention relates to a process for the production of alumina carrier having a remarkably large surface area and a controlled pore volume, in particular, γ-alumina, through rapid crystal growth of boehmite.

Alumina is widely used as a catalyst carrier because it has high mechanical strength and a large specific surface area, which is greater than that of other substances. The activity of a catalyst is generally in proportion to the surface area thereof. Therefore, many attempts are made in this field to attain an increase of the specific surface area of alumina and to improve its catalytic activity.

γ-Alumina has superior (high) thermal stability and mechanical strength and, in addition, a large specific surface area. It is well known in the art that γ-alumina can be produced by calcining boehmite gel and that boehmite gel is a hydrated gel of fibrous boehmite crystallite which is referred to as "pseudo-boehmite". The boehmite gel can generally be produced by aging noncrystalline aluminum hydroxide at a temperature of 50° C. or higher and a pH value of 6 to 10. If it is desirable to produce γ-alumina having a large specific surface area, the crystal size of said pseudo-boehmite must be adjusted to a suitable size. Naturally, when said pseudo-boehmite has an excessively large crystal size, the γ-alumina formed by calcination of said pseudo-boehmite will have a relatively small specific surface area. In addition, when said pseudo-boehmite has an excessively small crystal size, the resultant γ-alumina will also have a reduced specific surface area. This is because the pseudo-boehmite crystallites are sintered during calcination. Furthermore, if a boehmite gel comprising crystals having a range of different sizes is used, there will be reduction of the specific surface area of the resultant γ-alumina, because during calcination, thermally unstable boehmite crystallites sinter and, as a result of sintering, they form relatively large crystals. Accordingly, in order to obtain alumina having a very large specific surface area, it is necessary to first produce a boehmite gel which is grown to a minimum size, the size being such as not to cause sintering of the gel during calcination, and which has a uniform particle size.

In many catalytic reactions, in addition to the specific surface area having an effect on the catalytic activity, the pore size of the catalyst also has an important effect on the catalytic activity. The smaller the average pore size, the lower the diffusion rate of the reaction molecules into the pores, resulting in a decrease of the catalytic effectiveness factor and lower catalytic activity. Furthermore, when the average pore size is increased, the catalytic effectiveness factor is also increased, but an increase in the effective coefficient stops after the average pore size is increased to a specific value. If the average pore size is increased beyond said specific value, the apparent catalytic activity will be decreased as a result of a decrease in the packing density because the pore volume of the catalyst is increased. Generally, in order to provide a catalyst exhibiting maximum catalytic activity, it is necessary to produce a carrier which has both a maximum specific surface area and an optimum pore size.

2. Description of the Prior Art

The conventional methods for controlling the pore size of alumina comprise controlling the size of pores formed between the ultimate particles of alumina as a result of the control of the size of said ultimate particles. These conventional methods have a defect, namely, a reduced specific surface area of the product alumina, because alumina having an increased particle size must be provided to make a large pore size. Various methods are proposed to control shrinkage of the gel structure during drying and calcining of the boehmite gel. These methods are proposed as methods which can maintain the specific surface area of γ-alumina at a high value and also control its average pore size. With regard to these well-known methods, control of the average pore size is deemed to be identical with that of the pore volume because, the specific surface area of alumina cannot be changed by these methods. Some examples of these well-known methods include (1) the method of varying the drying speed of the boehmite gel ("J. Polymer Science", Vol. 34, 129); (2) the method of applying of shearing stress on the concentrated boehmite gel (Japanese Patent Application Laying-open Gazette Sho 49-31597) and the like. These methods are disadvantageous in that the range of pore volume controllable by these methods is very narrow. Furthermore, methods for controlling the pore volume of γ-alumina to widen its range are proposed and they include the (1) method of adding a water-soluble polymer such as polyethylene glycol and the like to the boehmite gel (Japanese Patent Application Laying-open Gazette Sho 52-104498 and 52-77891); and (2) the method of replacing a part of, or the major part, of water in the boehmite gel with alcohol(s) (Japanese Patent Application Laying-open Gazette Sho 52-123588) and the like. The former method relates to control the pore volume by an inhibition of dense aggregation of the boehmite crystallites by the surface tension of the water during the drying step, based on the amount of addition of the water-soluble polymer. This method is not preferred on economic grounds because the anti-aggregation agent used eventually must be calcined and removed. In addition, it is difficult using this method to prevent a decrease in the surface area due to the exothermic heat during the calcination. The latter method relates to control the pore volume of alumina by modifying the surface tension of water and, therefore, controlling the degree of aggregation of the boehmite crystallites, by varying the amount of alcohol used in place of water. The defects of this method are that apparatus for recovering the alcohol is necessary, and that the resulting alumina has poor water-resistant characteristics, and is easily cracked upon water absorption.

Methods for increasing the pore volume without using additives as described hereinbefore are also well known. These well-known methods include the method disclosed in Japanese Patent Publication Sho 49-37517, in which a part of the boehmite gel is first changed to xerogel and the xerogel is then incorporated into a hydrogel of boehmite to increase the pore volume. This method is limited to the production of alumina having a so-called "double peak"-type pore distribution, namely, alumina having small pores formed between the boehmite crystallites and large pores, for example more than 500 Å, formed between the xerogels. Such catalysts having a "double-peak"-type pore distribution when compared with conventional catalysts having a single peak-type pore distribution, usually are disadvantageous in that the catalytic activity is lower.

SUMMARY OF THE INVENTION

An object of the present invention is to provide a process which gives an alumina carrier having a large surface area and control of the pore volume by a controlled number of repetitions of sequentially adding an aluminum compound or a neutralizing agent, without adding an anti-aggregation agent or alcohols. The thus obtained alumina carrier has a large surface area as well as a predetermined pore volume, for instance, ranging from 0.5 to 2.0 cubic centimeters per gram (cc/g), and a single peak-type pore distribution, in particular, $\gamma$-alumina.

This invention provides a process for the production of an alumina carrier which comprises (a) adding an aluminum compound to a hydrogel of an aluminum hydroxide maintained at a pH value fo 6 to 10 and at a temperature of 50° C. or higher in order to adjust the pH value of said hydrogel to a value of less than 5 or more than 11, and (b) adding a neutralizing agent to adjust again the pH value of said hydrogel to from 6 to 10, and repeating the operation until an alumina carrier having a predetermined pore volume ranging from 0.5 to 2.0 cubic centimeters per gram is obtained.

The present invention comprises exposing an aluminum hydroxide hydrogel (hereinafter this is referred to as "seed aluminum hydroxide") to a pH region for causing deposition of solutes and then to a pH region for causing dissolution of crystals, by sequentially adding an aluminum compound and a neutralizing agent to said hydrogel maintained at a temperature of 50° C. or higher and agitating. In the pH region for causing deposition of solutes, aluminum hydroxide having high reactivity (hereinafter this is referred to as "active aluminum hydroxide") is formed, and the resulting active aluminum hydroxide is occluded into the seed aluminum hydroxide to accelerate its crystal growth. On the other hand, in the pH region for causing dissolution of crystals, acceleration of the dissolution of a fine crystal of aluminum hdyroxide which is coexisting with the seed aluminum hydroxide occurs, and thus uniformity of the crystal size of the aluminum hydroxide product is obtained. According to the present invention, a rapid crystal growth of aluminum hydroxide having a uniform crystal size can be attained.

Additionally, in the present invention, a sparse aggregate is formed by binding crystals of aluminum hydroxide by a further addition of the above-mentioned active aluminum hydroxide to the grown crystal of aluminum hydroxide. An alumina having a controlled pore volume and a large surface area can be produced by controlling shrinkage of the crystal of aluminum hydroxide at drying by varying the state of aggregation of said sparse aggregates.

DETAILED DESCRIPTION OF THE INVENTION

Figure 1:
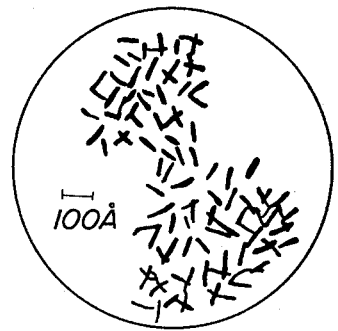
FIG. 1 depicts, schematically, aluminum hydroxide crystallites prepared by mixing an aqueous solution of aluminum chloride and aqueous ammonia at 90° C., namely, seed aluminum hydroxide effective as the starting material of this invention.

The process according to this invention is a simple process which comprises the operation of adding alternately (a) an aluminum compound and (b) a neutralizing agent, to a hydrogel of seed aluminum hydroxide, while maintaining at a suitable temperature of 50° C. or higher. The first characteristic feature of this invention resides in that crystal growth of aluminum hydroxide is practiced. When an aluminum compound is added to a seed aluminum hydroxide and a neutralizing agent is then added to the mixture, the aluminum compound is converted to an active aluminum hydroxide having a high reactivity and the resulting active aluminum hydroxide is occluded into the seed aluminum hydroxide within a short time, thereby a seed aluminum hydroxide which has grown can be obtained. This is a first characteristic feature of this invention.

Conventional processes for the production of boehmite gel generally include the step of aging the seed aluminum hydroxide. Therefore, the pH value of the seed aluminum hydroxide is kept within a range of 6 to 10, suitable for the formation of boehmite. In this pH range, the rate of dissolution of the crystallites is very low and, therefore, the rate of crystal growth is extremely low under these conditions. The crystal growth is caused by the dissolution of crystallites and deposition of solutes of relatively large crystals. Accordingly, the above conventional process requires a prolonged length of time for crystal growth of the boehmite. However, in accordance with the process of this invention, the time required for the crystal growth of boehmite can be greatly shortened because the active aluminum hydroxide necessary for the crystal growth is rapidly formed.

A second characteristic feature of this invention resides in that ultrafine crystallites of the aluminum hydroxide or boehmite freshly formed during the repeated operation of addition of the aluminum compound and the neutralizing agent, are dissolved by adding the aluminum compound to change the pH to a value below 5 or above 11, which is a pH region for dissolving aluminum hydroxide and, consequently, boehmite sol composed only of the grown boehmite crystallites are obtained which have stability to acid or alkaline conditions and are of relatively large particle size.

On the other hand, the simultaneous addition of the aluminum compound and the neutralizing agent in a continuous or discontinuous process has been proposed which can also increase the rate of growth of the boehmite crystallite as well as the process of this invention. However, this process results in a generally reduced rate of dissolution of newly formed aluminum hydroxide crystallite which are usually formed in the process. This is because the pH during this process is fixed in the range of 6 to 10, suitable for and indispensable to the growth of boehmite. Accordingly, the boehmite hydrogel prepared by this well-known process will contain a range of sizes of crystallites and the thus obtained boehmite gel will result in a decrease of the specific surface area to the $\gamma$-alumina produced as the result of sintering said fine crystallites during calcination. Thus, $\gamma$-alumina having surface area of less 300 $m^2/g$ is only obtained by this process. On the contrary, the boehmite gel prepared by the process of the present invention is a suitable starting material which is adapted for the preparation of $\gamma$-alumina having a large surface area, namely more than 300 $m^2/g$. This is because the boehmite gel produced by the process of the present invention has crystallites which are grown to large crystallites of uniform size. Therefore, the above-mentioned well-known process is substantially different from the process of this invention, which comprises an alternate addition of the aluminum compound and the neutralizing agent.

A third characteristic feature of this invention resides in a formation of sparse aggregates as a result of adhesion of the grown boehmite crystallites with one another by repeating the sequential addition of the aluminum compound and the neutralizing agent many times. Namely, the seed aluminum hydroxide grows in relation to the increase in the number of said sequential additions, so that boehmite is formed and thereafter the speed of crystal growth slows. If the addition of the aluminum compound and the neutralizing agent is continued further, the resulting active aluminum hydroxide deposits not only on the surface of the crystallites, but also on the contacting parts (surfaces) of the crystallites. A portion of the resulting active aluminum hydroxide forms new crystallites of aluminum hydroxide which is rapidly dissolved by subsequently adding the aluminum compound to adjust the pH value of the hydrogel to less than 5 or more than 11. On the other hand, the aluminum hydroxide deposited on the surface or on the contacting parts of the boehmite crystallites shows a lower rate of dissolution. Accordingly, an increase of the number of repetitions of the operation of adding the aluminum compound and the neutralizing agent, leads to an increase of the sparse-aggregated boehmite crystallites and, in addition, a reinforcement of the bonding between said boehmite crystallites. If the sparse-aggregated boehmite crystallites are increased or the reinforcement of the bonding between these boehmite crystallites is improved, both the specific surface area and the pore volume of the finally resulting $\gamma$-alumina will be increased because dense aggregation, or shrinkage of the boehmite gel is inhibited during drying process. This is the reason why the pore volume of the product $\gamma$-alumina can be controlled by determining, adequately, the amount of addition of the aluminum compound and of the neutralizing agent in each operation, and the number of repetitions thereof. Furthermore, such formation of sparse aggregates cannot be attained by any conventional process comprising the aging step of the seed aluminum hydroxide. Consequently, $\gamma$-alumina produced by the process of this invention has a highly improved mechanical strength which is higher than that of $\gamma$-alumina which is produced by any other conventional process.

The mechanical strength is shown as side crushing strength which is measured by the following method. Sample of the extrudate having a length of more than 5 millimeters, which was dried at 200° C. until it reaches constant amount, was placed lengthwise on a platform scale (for example, KIYA intensity tester), and is compressed gradually by a metalic rod having a flat surface (disc) of 5 millimeters in diameter. A load (Kg) at crushing of said sample is indicated by the scale and said load (Kg) is designated as "Side crushing strength".

For example, $\gamma$-alumina prepared by the process of this invention has a mechanical strength of more than 2.0 Kg when the extrudate (diameter 1.6 mm$\phi$) of said alumina having a pore volume more than 1.0 cc/g and a specific surface area of more than 300 $m^2/g$ is tested according to the above method. On the other hand, a known alumina prepared by substituting water in alumina hydrogel for a water soluble organic solvent in order to enlarge its pore volume, which has a pore volume of 1.15 cc/g, a specific surface area of 310 $m^2/g$ and a diameter of 1.8 mm$\phi$, shows only a mechanical strength of 0.9 Kg.

As described above, alumina of the present invention shows higher mechanical strength than that of the prior art, although said alumina has a similar value in a pore volume and a specific surface area, and a small value in a diameter.

The following is a more detailed explanation of the invention.

The aluminum hydroxide-containing slurry which is used as the starting material in the process of this invention is the seed aluminum hydroxide. It is produced by the conventional methods generally used in this field. For example, the seed aluminum hydroxide is produced within a range of pH 6 to 10 by methods such as (1) adding alkali to an aqueous solution of an aluminum salt of a strong acid such as aluminum nitrate, aluminum chloride, aluminum sulfate and the like; (2) adding acid or said aluminum salts to an aqueous solution of sodium aluminate or potassium aluminate, etc.

The aluminum hydroxide is preferably aluminum hydroxide that is prepared by aging at a temperature of 50° C. or higher to cause partial crystal growth. The newly formed aluminum hydroxide is dissolved by changing to the pH region in which dissolution of crystal occurs. On the other hand, aluminum hydroxide aged at a pH of from 6 to 10 has a structure like that of boehmite, and said aluminum hydroxide is hardly dissolved when an aluminum compound is added. Accordingly, said aluminum hydroxide can be used as the seed aluminum hydroxide.

The boehmite crystallite grown by hydrothermal treatment of aluminum hydroxide gel or an aqueous solution of basic aluminum salt may be used as the seed aluminum hydroxide.

Any water-soluble aluminum salt is preferred as the aluminum compound to be added to the hydrogel of seed aluminum oxide. An aluminum salt of a strong acid, or an aluminate, is most preferred because a small addition of such a salt can adjust the pH value of the hydrogel to less than 5 or more than 11. Suitable aluminum salts includes aluminum chloride, aluminum nitrate, aluminum sulfate and the like. The preferred aluminate includes sodium aluminate, potassium and aluminate, and the like. The neutralizing agent used in this invention may be any substance which can neutralize the aluminum compound. For example, an aqueous solution of an alkali such as sodium hydroxide, sodium carbonate, potassium hydroxide, ammonia and the like or sodium aluminate, potassium aluminate and the like can be employed as a neutralizing agent for an aluminum salt of a strong acid. An inorganic acid such as hydrochloric acid, nitric acid, sulfuric acid, carbonic acid and the like or one of the aforedescribed aluminum salts can be used for neutralization of an aluminate.

The process of this invention can be carried out by maintaining a hydrogel of seed aluminum hydroxide at a temperature of 50° C. or higher than 50° C., preferably 70° C. or higher, and then, an aluminum compound and a neutralizing agent is added sequentially two or more times, to said hydrogel under agitation. When the operation is carried out under atmospheric pressure, the temperature of said hydrogel does not increase to higher than the boiling point. However, the operation can be carried out at a temperature higher than the boiling point with the use of an autoclave. If the operation is done at a higher temperature than the boiling point in a pressure vessel, γ-alumina having a large average pore diameter can be obtained as a result of the increase in the size of boehmite crystallites. However, the specific surface area of the resulting γ-alumina is lower than that of γ-alumina which was prepared at a temperature less than the boiling point. Namely, the specific surface area of the product γ-alumina is influenced by the temperature of said hydrogel. In general, within the temperature range of 50° to 150° C., the specific surface area of γ-alumina is decreased at the rate of 20 to 40 square meters per gram per 10° C. increase of the temperature.

Therefore, in order to obtain an alumina having a large specific surface area, it is preferable to perform the operation at a temperature of from 50° C. to the boiling point. An amount of aluminum compound per one operation must be selected so that the pH value of the resulting hydrogel is controlled to a value of less than 5 or more than 11. As described above, the operation of controlling the pH value of the neutralized hydrogel to a value of 6 to 10, in particular, an adjustment to a pH of less than 5 through the addition of an aluminum salt of a strong acid or an adjustment to a pH of more than 11 through the addition of an aluminate, are important for redissolving aluminum hydroxide which is newly formed upon neutralization. When the pH is adjusted to less than 5, a proton is bonded to an $OH^-$ ion attached to aluminum hydroxide to form a monomeric or polymeric cation, thereby said aluminum hydroxide is dissolved. On the other hand, when the pH is adjusted to more than 11, a $H_2O$ molecule coordinated to aluminum hydroxide is substituted by a hydroxyl group to form an anion, thereby said aluminum hydroxide is dissolved.

When the amount of aluminum salt added per one step is relatively small, the resulting hydrogel shows a pH value ranging from 5 to 11 and the rate of dissolution of seed aluminum hydroxide is small. On the other hand, the addition of an excess amount of aluminum compound per one step is also not preferred. When an excess amount of aluminum compound is added in comparison with the starting seed aluminum hydroxide, the active aluminum hydroxide resulting upon neutralization is not completely occluded into the previously existing seed aluminum hydroxide or the growing boehmite. Therefore, the remaining active aluminum hydroxide bonds with one another to result in a formation of new seed aluminum hydroxide crystallite. As is clear from the above explanation, the addition of an excess amount of aluminum compound accelerates the formation of new seed aluminum hydroxide and results in a non-uniformity of particle size of the resulting boehmite. Accordingly, the amount of aluminum compound to be added per one step should be selected so that the pH value of the resulting hydrogel is less than 5 or more than 11 and new seed aluminum hydroxide is not produced. In general, a suitable amount of aluminum compound to be added is the order of 2 to 200 molar %, preferably, 10 to 100 molar % (molar ratio of aluminum in the aluminum compound to seed aluminum hydroxide). When the seed aluminum hydroxide is an amorphous crystallite, the rate of growth of seed aluminum hydroxide is very high in the first few repetitions of the operation (i.e., the sequential additions) and, therefore, only very little newly formed aluminum hydroxide is formed, even when the amount of aluminum compound added is 200 molar %. However, because the seed aluminum hydroxide has a tendency to form boehmite crystallites and to decrease rate of its growth in proportion to the increase in the number of repetitions of the operation, it is preferable to considerably reduce the amount of aluminum compound to be added. Similarly, when boehmite crystals are used as the seed aluminum hydroxide, it is preferable to reduce the amount of aluminum compound to be added because the rate of crystal growth is from the beginning of the process very low. When the seed aluminum hydroxide are amorphous crystallites, seed aluminum hydroxide having a diameter of about 10 to 20 Å must be grown to boehmite grains having a diameter of 30 to 40 Å in order to have all of the starting seed aluminum hydroxide grow into boehmite an aluminum compound in an amount several times as much as the seed aluminum hydroxide is required. Formation of boehmite in the form of sparse aggregates becomes very great at the point close to the maximum amount of addition. When aluminum compound is added in an amount larger than the maximum amount, it causes the formation of new aluminum hydroxide crystallites and a decrease of the surface area due to an over growth of the boehmite crystallite. The number of operations (stages) required to obtain alumina having a predetermined and desired pore volume, namely, the number of repetitions of the operation comprising the alternate addition of aluminum compound and neutralizing agent to seed aluminum hydroxide, is related to the amount of aluminum compound to be added per one operation. As to the amount of aluminum compound added per one operation, it is, as described above, desirable to set a minimum amount necessary for changing the pH of the seed aluminum hydroxide to a value of less than 5 or more than 11. When the addition is at this minimum, boehmite gel having a uniform particle size can be obtained. However, a large number of repetitions of the operation is needed if the amount of aluminum compound added per one operation is the minimum amount. In general, three or more repetitions of the operation are required. The upper limit of the number of repetitions of the operation cannot be simply determined because it varies depending upon various conditions, but, based on economic considerations, about twenty repetitions is deemed to be a reasonable maximum.

The concentrations of the aqueous solution of the aluminum compound, and of the neutralizing agent, are not critical. However, it should be controlled so that the solid content of the hydrogel does not increase excessively. When the concentration of the aqueous solution of the aluminum compound and of the neutralizing agent, is increased excessively, complete agitation of the hydrogel cannot be attained. This results in a partial denseness of sparseness of the aluminum compound or of the neutralizing agent after they are added, and results in the formation of a non-uniform hydrogel of boehmite. Therefore, the said concentrations preferably should be selected so that uniform and complete agitation of the hydrogel can be carried out during the entire process. In addition, we have discovered that the above concentrations should be maintained generally 5% by weight or less, and preferably 3% by weight or less, although said concentration also depends on the intensity of the agitation.

The interval of the operation of sequential addition is influenced by temperature and the pH value of the aluminum hydroxide hydrogel. As for the time for adding the aluminum compound, it should be deferred until sufficient crystal growth of the seed aluminum hydroxide is observed. At a temperature of 70° C. or less and a pH of from 6 to 7, crystal growth of the seed aluminum hydroxide is very slow and requires one or more hours for aging. On the contrary, the aging time necessary for the crystal growth of the seed aluminum hydroxide is only 20 minutes or less when the temperature is 80° C. or higher and the pH is 8 or more. The neutralizing agent has to be added after sufficient progress of the dissolution of the fine crystals of aluminum hydroxide. The higher the temperature is, or the higher the degree of alkaline or acidity, the shorter the time required for the dissolution becomes. In general, it requires twenty minutes or less as the sufficient time when the temperature is 50° C. and the pH value is 5 or less.

Ions present in the boehmite hydrogel, in particular, polyhydric anions, inhibit the crystal growth of boehmites. This is because said polyhydric anion easily coordinates to an aluminum ion as it does to a hydroxyl group or water molecule and said polyhydric anions are strongly adsorbed on the surface of the boehmite particles. Therefore, when aluminum sulfate is used as the aluminum compound, the temperature and pH after neutralization must be increased as high as possible to promote the rate of crystal growth of boehmites. Furthermore, it is also possible to wash and remove the sulfate ion during an operation to shorten the aging time in each of the operations (stages) and consequently to shorten the total time required for the overall process.

When an aluminum salt of strong acid is used as the aluminum compound, an alkali can be used as the neutralizing agent. When an aluminate is used as the aluminum compound, an acid can be used as the neutralizing agent. There are no substantial differences between these two combinations because the operation and phenomenon of the former combination is very similar to that of the latter combination. Therefore, the following explanation concerning the process for controlling pore volume of $\gamma$-alumina will be made referring to a combination of aluminum chloride and ammonia, as one example of the possible combinations.

Figure 2:
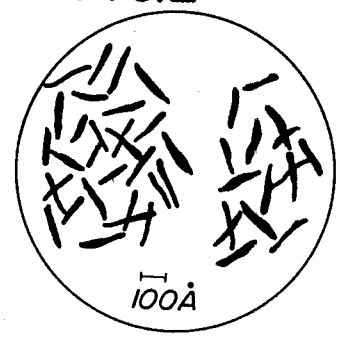
FIG. 2 depicts boehmite crystals prepared by repeating six times the operation of sequentially adding aluminum chloride and ammonia to the seed aluminum hydroxide as shown in FIG. 1, maintained at 90° C., with vigorous agitation.

As a first stage, an aqueous solution of aluminum chloride and aqueous ammonia is mixed to produce seed aluminum hydroxide. A model (diagrammatic illustration) of the resulting seed aluminum hydroxide, based on electron microscopic photographs, is shown in FIG. 1. Properties of the seed aluminum hydroxide such as higher water retaining ability, high viscosity and translucency are based on a fine network of the fibrous aluminum hydroxide. Thereafter, sequential addition of a suitable amount of aluminum chloride and aqueous ammonia in an amount necessary to neutralize said aluminum chloride to a hydrogel of seed aluminum hydroxide is repeated (it should be noted herein that one operation consisting of adding an aluminum compound and a neutralizing agent in an amount necessary to neutralize the aluminum compound sequentially is referred to as "one stage"). The hydrogel becomes white and opaque and, simultaneously, its viscosity is decreased as the operation is repeated. For example, a model of boehmite in the resulting hydrogel is shown in FIG. 2, in which the hydrogel was prepared by repeating the operation in six stages, i.e., by adding to seed aluminum hydroxide, an aqueous solution of aluminum chloride, which corresponds to a one-third aluminum molar ratio of aluminum chloride to said seed aluminum hydroxide, and an aqueous ammonia in an amount necessary to neutralize said aluminum compound, with agitation, at a temperature maintained at 90° C. The resulting hydrogel was then washed to remove ammonium chloride and dried. The dried product was then subjected to an X-ray diffraction analysis. The result of this X-ray analysis showed that the dried product is pseudoboehmite. That is to say, the resulting hydrogel appears to be composed of boehmite fibers having a diameter of 30–40 Å and a length of at least two hundred angstroms, or a multiple thereof. The phenomenon of the change of the hydrogel color to white and opaque, and the decrease of its viscosity, as described hereinabove, are a result of the growth of its crystallites. In this condition, the boehmite crystallites in the resulting hydrogel are loosely distributed relative to one another. On the other hand, even if any other combination of an aluminum compound and a neutralizing agent is applied, all of the resulting hydrogel is loosely distributed in the same condition, as described above, when the total amount of aluminum compound is added in a two molar ratio based on the amount of seed aluminum hydroxide. In addition, the $\gamma$-alumina produced from the above hydrogel has a specific surface area of 260 to 280 square meters per gram ($m^2$/g) and a pore volume of 0.5 to 0.6 cc/g. For this case, the reason why the specific surface area of $\gamma$-alumina is less than 300 square meters per gram resides in the fact that the boehmite crystallites are densely aggregated, and thereby the surface of the boehmite crystallites partly disappears (is lowered). When aluminum chloride is added in a single addition in an amount of a two molar ratio based on the amount of seed aluminum hydroxide, and then an aqueous ammonia is added to neutralize, the hydrogel thus obtained is non-uniform and contains crystals more fine than those of the hydrogel shown in FIG. 2. The specific surface area of $\gamma$-alumina resulting from the above hydrogel is less than 250 square meters per gram. Accordingly, the amount of aluminum chloride added in each operation should be so that the molar ratio of said added aluminum to said seed aluminum hydroxide is less than 2 (2:1), preferably less than an equivalent amount (1:1), and more preferably less than one-half (0.5:1).

Figure 3:
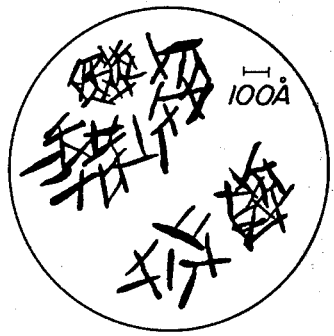
FIG. 3 depicts sparse aggregates of boehmite. The sparse aggregates of boehmite were prepared by repeating an additional five times, the operation of adding aqueous aluminum chloride solution and ammonia to the hydrogel described in the preceding paragraph and under the conditions described therein, while maintaining the temperature at 90° C. and with vigorous agitation so that the operation was repeated a total of eleven times. The sparse aggregates have spaces between the component crystallites.

Thereafter, to the hydrogel shown in FIG. 2, an additional five identical operations are performed, that is, the total number of stages becomes eleven. The hydrogel obtained after the eleventh stage is, in appearance, hard to distinguish from that obtained after the sixth stage. However, the boehmite hydrogel of the former, as is shown in FIG. 3, depicts the partial start of the formation of sparse aggregates. For the present case, the formation of sparse aggregates can be confirmed when the total addition of aluminum compound in an amount 3.67 times that of the starting seed aluminum hydroxide has been completed. The said amount of aluminum compound which must be added varies within the range of 2 to 6 times that of the starting seed aluminum hydroxide, depending upon the specific aluminum compound used, the temperature and pH values for the formation of seed aluminum hydroxide, the amount of the aluminum compound added per operation, and the like.

Figure 4:
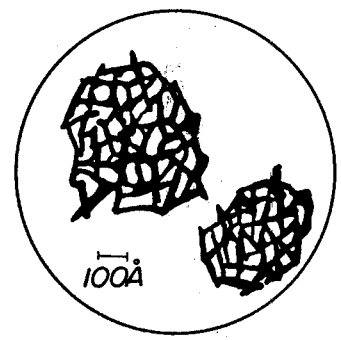
FIG. 4 depicts sparse aggregates of boehmite, prepared under the conditions described in the preceding paragraph, except that the operation was carried out an additional four times for a total of fifteen times.

To the hydrogel shown in FIG. 3, an additional four identical operations are performed to bring the total number of stages to fifteen. The hydrogel obtained after the addition of aluminum chloride in an amount five times that of the seed aluminum hydroxide has a slightly lower viscosity, in comparison with that obtained after the sixth stage, and shows a slightly increased opacity. An aspect of the boehmite crystallite of the hydrogel is shown in FIG. 4 and, as is apparent from this drawing, the boehmite crystallites which are not orientated in any direction are bonded to one another to form a sparse aggregate having a size of 1000 to 3000 Å. Said spare aggregates are formed of individual aggregates which have spaces between at least some of the component crystallites which constitute each aggregate. The hydrogels illustrated in FIGS. 3 and 4 are pseudo-boehmites which, in an aspect of X-ray analysis, are substantially identical with the hydrogel illustrated in FIG. 2. However, the properties of alumina prepared from one of these hydrogels is greatly different from that of alumina prepared from the hydrogel of FIG. 2. For example, alumina prepared after the fifteenth stage has a specific surface area of 300 to 350 m$^2$/g and a pore volume of 1.0 to 1.5 cubic centimeters per gram, while alumina prepared after the eleventh stage has a specific surface area of 280 to 320 m$^2$/g and a pore volume of 0.7 to 1.0 cc/g. Furthermore, a major part of the above pore volume is based on the pores having a diameter of less than 500 Å. When the addition of aluminum chloride and ammonia is further repeated beyond said fifteenth stage, whiteness and opacity of the resulting gel are suddenly increased at the eighteenth stage. Such a phenomenon, which is also observed in any other combinatin of an aluminum compound and a neutralizing agent, is generally influenced by a variety of different factors. Namely, the phenomenon does not always happen at the stage of adding the aluminum compound in an amount of six times the amount of seed aluminum hydroxide, as described herein. As to the above hydrogels, it is supposed that they comprise sparse aggregates having a size of the order of 1000 to 3000 Å and that these sparse aggregates are further aggregated with one another, with the loss of degree of freedom, to form secondary aggregates having a size of the order of microns. In addition, γ-alumina, prepared from the hydrogel produced under the above conditions, has a specific surface area of 300 to 350 m$^2$/g and a pore volume of about 2 cc/g. It is surprising that alumina having such a huge pore volume possesses satisfactory mechanical strength effective in practical use. Thus, the pore volume of alumina can be controlled within the range of 0.5 to 2 cc/g while maintaining its specific surface area at a practically constant level, by varying the number of stages which comprise the addition of the aluminum compound and subsequent neutralizer, e.g., aluminum chloride and ammonia.

This invention is further illustrated by the following examples and comparative examples.

COMPARATIVE EXAMPLE 1

6 Liters of an aqueous solution of aluminum nitrate (Al$_2$O$_3$ concentration: 68 grams per liter) and 12 liters of deionized water were placed in a stainless steel vessel and then, after being heated to 90° C., 3 liters of 28% conc. aqueous ammonia were poured into the vessel, with vigorous agitation, to form jelly-like aluminum hydroxide having a pH of 9. The resulting aluminum hydroxide was aged at 90° C. for two hours, filtered and washed with 0.2% aqueous ammonia to remove the major portion of the nitrate ions. The thus obtained filter cake was heated to 90° C. and kneaded for two hours in a vessel provided with a high speed agitator. A part of the kneaded cake was taken out, extruded to obtain an extrusion (2 millimeters in diameter) and, then, after the extrusion was dried at 120° C. for four hours, calcined at 600° C. for three hours to form alumina, to obtain sample "R$_1$".

COMPARATIVE EXAMPLE 2

200 grams of washed boehmite cake produced in Comparative Example 1 was vigorously agitated in a 1 kilogram of isopropyl alcohol to form a slurry-like product and the obtained slurry-like product was filtered to five 180 grams of an alcoholic cake. The alcoholic cake was extruded through a die having an orifice size of 2 millimeters in diameter to form an extrusion, dried at 200° C. for one hour and calcined at 600° C. for three hours in an electric oven, to obtain sample "R$_2$".

COMPARATIVE EXAMPLE 3

12 liters of a deionized water at 95° C. were placed in a 40 liter stainless steel vessel provided with a steam jacket and then, with agitation, an aqueous solution of aluminum nitrate (Al$_2$O$_3$ concentration: 68 grams per liter) and 28% conc. aqueous ammonia were simultaneously added over 30 minutes at a flow rate of 0.15 liter per minute and 0.15 liter per minute, respectively. During this addition, the mixture was kept at a temperature of 95° to 100° C. and a pH value of 8.5 to 9.5, a gel was formed. After 30 minutes, the addition was stopped. The resulting hydrogel was kept at 95° C., aged for one hour, filtered and washed with 0.2% aqueous ammonia to remove the major portion of the nitrate ions. A part of the thus obtained filter cake was extruded to obtain an extrusion (2 mmφ) and, then, after the extrusion was dried at 120° C. for four hours, calcined at 600° C. for three hours to form alumina pellets, to obtain sample "R$_3$".

EXAMPLE 1

An aqueous solution, heated to 90° C., of aluminum nitrate (Al$_2$O$_3$ concentration: 68 grams per liter) was previously prepared in a separate vessel. Then, 12 liters of deionized water and 6 liters of the previously prepared aluminum nitrate solution were added to a 40 liter stainless steel vessel provided with a steam jacket. After 3 liters of 28% aqueous ammonia was poured into the vessel with vigorous agitation, a colorless and translucent jelly-like aluminum hydroxide (pH 9) was obtained. The jelly-like product is referred to herein as "seed aluminum hydroxide".

As the first operation, 3 liters of said aluminum nitrate solution and 0.9 liter of said 28% aqueous ammonia were added to the seed aluminum hydroxide, and slowly agitated at a temperature above 90° C. On adding, aluminum nitrate, the pH value of the resulting hydrogel was decreased to 3 and, simultaneously, its viscosity was decreased. However, when aqueous ammonia was added one minute later, the pH of the hydrogel changed to 9 and its viscosity was increased.

The said operation or stage, namely, alternate addition of aluminum nitrate and aqueous ammonia, was repeated while agitation was continued. In proportion as the number of repetitions of said operation was increased, the resulting hydrogel changed to a white and opaque hydrogel and, in addition, the viscosity of the resulting neutralized hydrogel (pH 9) was considerably lower than that of the hydrogel obtained at the initial stages. After said operation was repeated four times, a one-third portion of the resulting hydrogel was removed. To the remaining portion of the hydrogel, 2 liters of aluminum nitrate solution and 0.6 liter of 28% aqueous ammonia were added. The addition of aluminum nitrate solution and aqueous ammonia was repeated two times. Then, a half portion of the obtained hydrogel was removed, as described above, and, while the remaining portion of the hydrogel was maintained at a temperature of 90° C., a sequential addition to the hydrogel of 1 liter of aluminum nitrate solution and 0.3 liter of 28% aqueous ammonia was repeated two times. Each of these three different types of hydrogel prepared by carrying out a different number of the operation was filtered respectively, dispersed in 40 liters of a deionized water once again and said filtration and washing was repeated three times to form three cakes. The thus obtained cakes were dried at 120° C. for 2 hours. X-ray analysis of the cakes showed that all of the cakes were pseudoboehmites. The solid content of the cakes was 24% (4 repetitions of the operation), 26% (6 repetitions of the operation) and 27% (8 repetitions of the operation). Each of these cakes was extruded through a die having an orifice size of 2 millimeters in diameter to form a cylindrical product and then dried at 120° C. for four hours. Thereafter, the dried product was calcined at 600° C. for one hour in an electric oven.

The obtained alumina products were designated "A" (4 repetitions of the operation), "B" (6 repetitions of the operation) and "C" (8 repetitions of the operation). The properties of these extrudates A, B and C are summarized, together with those of alumina obtained in Comparative Examples 1, 2 and 3, in Table 1. The extrusions A, B or C have a larger specific surface area, in comparison with the specific surface area of the alumina obtained in Comparative Example 1. The extrusion C has a pore volume equivalent to that of alumina obtained in Comparative Example 2, but its side crushing strength is much higher than that of said alumina. The product C has a larger specific surface area than that of the alumina obtained in Comparative Example 3.

TABLE 1

| | Comparative Example | | | Example 1 | | |
|---|---|---|---|---|---|---|
| | 1 | 2 | 3 | A | B | C |
| Sample | R$_1$ | R$_2$ | R$_3$ | A | B | C |
| Specific surface area (m$^2$/g) | 260 | 310 | 260 | 275 | 310 | 320 |
| Pore volume (cc/g) | 0.64 | 1.15 | 1.03 | 0.72 | 0.95 | 1.13 |
| Pore distribution (cc/g) | | | | | | |
| 0–100 Å | 0.26 | 0.06 | 0.05 | 0.15 | 0.15 | 0.13 |
| 100–200 Å | 0.34 | 0.48 | 0.53 | 0.51 | 0.63 | 0.65 |
| 200–500 Å | 0.02 | 0.42 | 0.42 | 0.02 | 0.12 | 0.31 |
| 500– Å | 0.02 | 0.19 | 0.03 | 0.01 | 0.05 | 0.04 |
| Diameter of pellets (mm φ) | 1.2 | 1.8 | 1.6 | 1.4 | 1.5 | 1.6 |
| Side crushing strength (Kg) | 2.2 | 0.9 | 1.6 | 3.1 | 2.5 | 2.1 |

TABLE 1-continued

| | Comparative Example | | | Example 1 | | |
|---|---|---|---|---|---|---|
| | 1 | 2 | 3 | | | |
| strength (Kg) | 2.2 | 0.9 | 1.6 | 3.1 | 2.5 | 2.1 |

EXAMPLE 2

3500 grams of aluminum chloride (hexahydrate) was dissolved in deionized water to make 10 liters and the solution heated to 90° C., and maintained at 90° C. 1800 grams of caustic soda was dissolved in 10 liters of deionized water in a separate vessel and then, as was carried out in the above process, heated to 90° C.

Then, 2.8 liters of deionized water, heated to 90° C., and 0.8 liter of a previously prepared aqueous solution of aluminum chloride were added to a stainless steel mixing vessel provided with a steam jacket. With stirring, 0.8 liter of a previously prepared solution of caustic soda was added to the mixing vessel. The thus obtained viscous hydrogel had a pH of 9.

The agitation was further continued for three minutes. Then, as a first adding step, 0.8 liter of aqueous solution of aluminum chloride was added and, after agitation of an additional minute, 0.8 liter of aqueous solution of caustic soda was added. The above operation was repeated to prepare two kinds of hydrogel (number of the operation: 4 and 6 times).

The finally obtained two kinds of hydrogel were filtered and washed in accordance with the same process described in Example 1. The resulting boehmite cakes were extruded, dried and calcined. The properties of the obtained two kinds of alumina are as follows.

Number of the operation: 4 times
  Specific surface area: 270 m$^2$/g
  Pore volume:
    Pore diameter of less than 500 Å: 0.80 cc/g
    Pore diameter of more than 500 Å: 0.05 cc/g
Number of operation: 6 times
  Specific surface area: 315 m$^2$/g
  Pore volume:
    Pore diameter of less than 500 Å: 1.16 cc/g
    Pore diameter of more than 500 Å: 0.05 cc/g

EXAMPLE 3

An aluminum sulfate solution (Al$_2$O$_3$ concentration: 766 grams per liter) was heated to 90° C. and maintained at the same temperature. 9 Liters of deionized water was added to a stainless steel vessel provided with a mantle heater and then, heated to 90° C. Then, 6 liters of aqueous solution of said aluminum sulfate was poured into the vessel and, with vigorous agitation, 2.2 liters of 28% aqueous ammonia was rapidly added to form a hydrogel of seed aluminum hydroxide. With agitation, the resulting slurry was aged at a pH of 9 and a temperature of 90° C., for 13 minutes.

Then, as a first stage, 1 liter of aqeuous solution of said aluminum sulfate was added to the hydrogel obtained in said process. The viscosity of the hydrogel was suddenly decreased and its pH value was changed to 4. After two minutes, 0.4 liter of 28% aqueous ammonia was added to the slurry. The viscosity of the hydrogel was increased again and its pH value was changed to 9. After the above first operation had been completed, the hydrogel was aged, with slow agitation, at a temperature of 90° C. for three minutes and then the operation was repeated. After the separation was repeated five times, the resulting hydrogel was filtered and washed until no sulfate ion was found in the filtrate. The washed cake was transferred to the stainless steel vessel again and dispersed in 15 liters of deionized water at 90° C. Thereafter, the operation was repeated seven times.

The so obtained hydrogen was filtered and washed again and the filter cake was dispersed in 15 liters of deionized water at 90° C. in the same manner described above. Thereafter, the operation was repeated four times. The obtained hydrogel was repeatedly filtered and washed until no sulfate ion was found in the filtrate. The hydrogel was finally dehydrated by means of a pressure filter to give a hard cake having an alumina content of 25% by weight. The cake was extruded through a die having an orifice size of 1.0 mm$\phi$. The extrudates were dried in air and calcined at 500° C. for three hours in an electric oven.

In addition, a small amount of the hydrogel was removed as a sample at the specified stage of the process, washed and filtered. Each of the obtained cakes was dried and calcined in the same manner as described above to form alumina. The physical properties of these samples and the finally obtained alumina are summarized in Table 2.

TABLE 2

| Number of gelation stage | Specific surface area ($m^2/g$) | Pore volume* (cc/g) |
| --- | --- | --- |
| 1 | 184 | 0.280 |
| 4 | 316 | 0.375 |
| 8 | 345 | 0.539 |
| 12 | 350 | 0.807 |
| 16 | 345 | 1.201 |

*Pore volume: of pores having a diameter of less than 500 Å

EXAMPLE 4

4,500 grams of aluminum sulfate ($Al_2(SO_4)_3.16-18H_2O$) was dissolved in deionized water to prepare 22 liters of solution, heated to 90° C. and kept at that temperature. 4,100 Grams of sodium aluminate ($Na_2O$ 33.1%, $Al_2O_3$ 34.6%) was dissolved in water to prepare 22 liters of solution, heated to and maintained at 90° C. in the same manner described above. Then, 25 liters of a deionized water was charged into an enamel-coated vessel provided with an agitator and an electric heater, and boiled. 10 Liters of previously prepared aluminum sulfate solution was added to the boiled water and stirred for one minute. Then, with stirring, 10 liters of previously prepared sodium aluminate solution was added to prepare seed aluminum hydroxide. At this stage, the hydrogel of aluminum hydroxide had a pH of 9.

The resulting hydrogel of the seed aluminum hydroxide was boiled for ten minutes. Thereafter, as a first stage, 2 liters of aqueous solution of said aluminum sulfate was added to the hydrogel being agitated vigorously, then after one minute 2 liters of said sodium aluminate solution was added and boiling was carried out for ten minutes. After the operation was repeated six times, boiling was carried out for an additional hour to form boehmite hydrogel.

The boehmite hydrogel was repeatedly filtered and washed to obtain a boehmite cake which contains little sodium sulfate. The cake was extruded through a die having an orifice of 1.5 millimeters in diameter, and dried at 160° C. for three hours in a hot-air dried and calcined at 600° C. for one hour in an electric oven. The thus obtained alumina had a diameter of 1.1 millimeters, a specific surface area of 350 $m^2/g$ and a pore volume of 1.05 cc/g (of pores having a diameter of less than 500 Å). Alumina, prepared from slurry which had been sampled after the third stage had been completed, had a specific surface area of 315 $m^2/g$ and a pore volume of 0.72 cc/g (of pores having a diameter of less than 500 Å).

EXAMPLE 5

8 Liters of deionized water was charged into a stainless steel vessel provided with a steam jacket and was boiled. 1 Liter of aqueous solution of sodium aluminate which had been prepared by dissolving 2,860 grams of sodium aluminate ($Na_2O$ 32.7%, $Al_2O_3$ 35.2%) in water to make 10 liters at 95° C., was added to the boiled deionized water. Then, with stirring, 308 grams of 36% hydrochloric acid was added to the mixture to prepare a hydrogel of the seed aluminum hydroxide. Thereafter, as a first stage, 1 liter of said sodium aluminate solution and 308 grams of 38% hydrochloric acid were added sequentially to the hydrogel at an interval of one minute while the hydrogel was vigorously stirred at a temperature of more than 90° C. The pH value of the hydrogel was about 14 after the sodium aluminate have been added. If changed to a pH of 7 when the hydrogel was neutralized with hydrochloric acid.

After the neutralized hydrogel was boiled for five minutes, the operation was repeated ten times to form boehmite hydrogel. The boehmite hydrogel was repeatedly filtered and washed until no chloride ion was found in the filtrate, to form boehmite cake. Said boehmite cake was extruded through a die having an orifice size of 1.5 mm$\phi$. The extrudates were dried at 160° C. for one hour and then calcined at 600° C. for two hours. The resulting alumina had a diameter of 1.2 mm$\phi$, a specific surface area of 330 $m^2/g$ and a pore volume of 1.25 cc/g (of pores having a diameter of less than 500 Å). Alumina, prepared from the hydrogel which had been sampled after the sixth stage had been completed, had a specific surface area of 300 $m^2/g$ and a pore volume of 0.93 cc/g (of pores having a diameter of less than 500 Å).

EXAMPLE 6

4 Liters of aqueous solution of basic aluminum nitrate ($NO_3^-/Al=0.3$) ($Al_2O_3$ concentration: 5% by weight) was treated at 140° C. for five hours in a stainless steel autoclave to form white boehmite hydrogel. The resulting boehmite hydrogel (1 liter) was diluted with 1 liter of hot water, poured into a 10 liters mixing bath provided with a steam jacket and maintained at 80° C. With slow agitation, 30 cubic centimeters of 28% aqueous ammonia was added to the diluted hydrogel at a temperature of 80° C. Thereby, the aluminum nitrate remaining in the boehmite hydrogel was neutralized and the viscosity of the hydrogel increased. Thereafter, 0.2 liter of aluminum nitrate solution, prepared by dissolving 500 grams of aluminum nitrate ($Al(NO_3)_3.9-H_2O$) in hot water to make a total volume of 1 liter and maintained at 90° C., and 50 cubic centimeters of 28% aqueous ammonia were added sequentially to the hydrogel at an interval of one minute, while agitating, and the agitation was continued. After the above operation was repeated five times, repeated washing and filtering was carried out to obtain a boehmite cake.

The boehmite cake was extruded to form extrudates having a size of 1.5 mm$\phi$, dried in air and calcined at 550° C. for two hours. The so obtained alumina had a specific surface area of 210 m²/g and a pore volume of 1.21 cc/g (of pores having a diameter of less than 500 Å) and 0.03 cc/g (of pores having a diameter of more than 500 Å). In contrast, alumina, prepared by subjecting the starting boehmite hydrogel to washing, filtering and calcining processes, had a specific surface area of 200 m²/g and a pore volume of 0.60 cc/g (of pores having a diameter of less than 500 Å).

As noted hereinbefore, the number of repetitions of the sequential addition of said aluminum compound, followed by addition of the neutralizing agent to return the pH to the range of 6–10, varies depending upon the specific reactants utilized, their concentration, process conditions, etc., as well as the characteristics of the product to be produced by the process. However, as evidenced by the examples, it is preferred to utilize at least five repetitions of said sequence. It is contemplated that the process will generally be carried out utilizing between 3 and 20 repetitions and more preferably between 5 and 15 repetitions of said sequential addition.

In order to carry out the process in a shorter time, it is preferred that the pH should be between about 8 and 9.5. As noted hereinbefore, the temperature is preferably between 70° C. and the boiling point of the reaction mixture. It is more preferably carried out at a temperature of about 85°–95° C. and it is particularly preferred to carry it out at a temperature of about 90° C.

The filtered cake product obtained after the total of repetitions of the sequential addition of the aluminum compound and the neutralizing agent is completed, has been subject to X-ray analysis indicating that the cakes are formed from pseudo-boehmites which is sometimes simply referred to herein as "boehmites". Although the precise nature of this intermediate material has not been identified with more precision, the material produced during the process and obtained in the filtered cake is formed of aggragates. Each aggragate is an aggragation of crystallites formed of hydrated aluminum oxide. There are spaces between the crystallites which together form the aggragate as illustrated in FIGS. 3 and 4 which is the basis for the identification of such aggragates as "sparse aggragates".

It is an important feature of the present invention to provide the improved alumina product of the present process this product is characterized by high mechanical strength, a large specific surface area and a substantially uniform pore size distribution in a relatively small portion of the pore size range below 500 Å. The dried and calcined alumina forms γ-alumina, having a specific surface area of more than 300 m²/g, and preferably having a specific surface area of between about 320 and 350 m²/g.

We claim:

1. A process for the production of an alumina suitable for use as a catalyst carrier comprising
   establishing a seed aluminum hydroxide hydrogel having a pH of between about 6 and 10 at a temperature of at least about 50° C.,
   sequentially adding
   (a) an aluminum compound of said hydrogel to adjust the pH of said hydrogel to a value of less than 5 or more than 11 whereby fine crystallites of the aluminum hydroxide are dissolved, and
   (b) then adding a neutralizing agent to said hydrogel to return the pH of the range of from about 6 to 10 to cause hydrated aluminum oxide crystallites to grow,
   then repeating at least two additional times said sequential addition of said aluminum compound and of said neutralizing agent to continue the growth of said hydrated aluminum oxide crystallites, and
   drying and calcining said hydrated aluminum oxide crystallites to form crystalline alumina having a predetermined pore volume ranging from 0.5 to 2 cubic centimeters per gram.

2. The process of claim 1 wherein said aluminum compound is an aluminum salt of a strong acid which is added to adjust the pH to a value of less than 5.

3. The process of claim 2 wherein said aluminum salt is selected from the group consisting of aluminum nitrate, aluminum chloride, and aluminum sulfate.

4. The process of claims 1, 2 or 3 wherein said neutralizing agent is selected from the group consisting of ammonia, sodium hydroxide, potassium hydroxide, sodium carbonate, potassium carbonate, sodium aluminate and potassium aluminate.

5. The process of claim 1 wherein said aluminum compound is an aluminate which is added to adjust the pH to a value larger than 11.

6. The process of claim 5 wherein said aluminate is sodium aluminate or potassium aluminate.

7. The process of claims 1, 5 or 6 wherein said aluminum compound adjusts the pH to a value larger than 11 and wherein said neutralizing agent is selected from the group consisting of sulphuric acid, nitric acid, hydrochloric acid, aluminum sulfate, aluminum nitrate and aluminum chloride.

8. The process of claim 1 wherein said temperature during said sequential additions is between 70° C. to the boiling point of the reaction mixture.

9. The process of claim 1 wherein said aluminum compound is added in an amount of from 2 to less than 200 molar percent of added aluminum compound based on said seed aluminum hydroxide.

10. The process of claims 3 or 6 wherein said aluminum compound is added in an amount of from 2 percent up to 100 molar percent of aluminum compound based on said seed aluminum hydroxide.

11. The process of claim 4 wherein said aluminum compound is added in an amount of between 2 to less than 50 molar percent of added aluminum compound based on said seed aluminum hydroxide.

12. The process of claim 7 wherein said aluminum compound is added in an amount of between 2 to less than 50 molar percent of added aluminum compound based on said seed aluminum hydroxide.

13. The process of claims 1, 3, 6, 8, or 9 wherein said sequence of addition of aluminum compound and then addition of neutralizing agent is repeated between 3 and 20 times.

14. The process of claim 11 wherein said sequence of addition of aluminum compound and then addition of neutralizing agent is repeated between 3 and 20 times and wherein said temperature during said repetitive additions is maintained at between 70° C. and the boiling point of the reaction mixture.

15. The process of claim 12 wherein said sequence of addition of aluminum compound and then addition of neutralizing agent is repeated between 3 and 20 times and wherein said temperature during said repetitive additions is maintained at between 70° C. and the boiling point of the reaction mixture.

* * * * *